United States Patent
Uchiyama et al.

(10) Patent No.: US 9,057,174 B2
(45) Date of Patent: Jun. 16, 2015

(54) DIAGNOSIS SYSTEM AND DIAGNOSIS METHOD FOR CONSTRUCTION MACHINE

(75) Inventors: Hiroki Uchiyama, Kawasaki (JP); Yoshinori Furuno, Tsuchiura (JP); Hideaki Suzuki, Hitachi (JP); Kozo Nakamura, Hitachiota (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 589 days.

(21) Appl. No.: 13/502,896

(22) PCT Filed: Oct. 19, 2009

(86) PCT No.: PCT/JP2009/068038
§ 371 (c)(1),
(2), (4) Date: Apr. 19, 2012

(87) PCT Pub. No.: WO2011/048661
PCT Pub. Date: Apr. 28, 2011

(65) Prior Publication Data
US 2012/0209570 A1    Aug. 16, 2012

(51) Int. Cl.
G06F 11/00 (2006.01)
E02F 9/20 (2006.01)
E02F 9/26 (2006.01)

(52) U.S. Cl.
CPC .............. *E02F 9/2025* (2013.01); *E02F 9/267* (2013.01)

(58) Field of Classification Search
CPC ....................................... G06F 15/00
USPC ....................................... 702/183
See application file for complete search history.

(56) References Cited

U.S. PATENT DOCUMENTS 7,444,216 B2 * 10/2008 Rogers et al. ................ 701/31.4
8,423,226 B2 *  4/2013 Underdal et al. ............ 701/31.4
(Continued)

FOREIGN PATENT DOCUMENTS

CN    101162394    4/2008
CN    101263499    9/2008
(Continued)

OTHER PUBLICATIONS

JP Office Action for Japanese Patent Application No. 2011-537044, issued on Feb. 5, 2013.
(Continued)

*Primary Examiner* — Tung S Lau
*Assistant Examiner* — Xiuquin Sun
(74) *Attorney, Agent, or Firm* — Baker Botts L.L.P.

(57) ABSTRACT

A construction machine diagnosis system is provided. A diagnosis device 10 acquires diagnostic data from a diagnostic data storage device 30, extracts data characteristics from the information contained in the diagnostic data, acquires from a diagnostic knowledge storage device 20 any diagnosing techniques considered to be effective for the data characteristics, and presents to a user the diagnosing techniques along with respective degrees of effectiveness. The user uses the presented degrees of effectiveness to select a desired diagnosing technique and conduct a diagnosis. In addition, in order to make effective use of the diagnostic knowledge stored within the diagnostic knowledge storage device 20, a diagnostic knowledge generating section 107 classifies common data characteristics by elements of diagnosing techniques and stores the classified data characteristics and the elements of the diagnosing techniques, as new diagnostic knowledge.

6 Claims, 14 Drawing Sheets

(56) References Cited

U.S. PATENT DOCUMENTS

| | | | |
|---|---|---|---|
| 2002/0002430 A1 | 1/2002 | Nada | |
| 2007/0299575 A1 | 12/2007 | Yamada et al. | |

FOREIGN PATENT DOCUMENTS

| | | |
|---|---|---|
| CN | 101434221 | 5/2009 |
| CN | 101438249 | 5/2009 |
| JP | 5-26782 | 2/1993 |
| JP | 7-271589 | 10/1995 |
| JP | 8-164827 | 6/1996 |
| JP | 08-221117 | 8/1996 |
| JP | 10-232874 | 9/1998 |
| JP | 10-275168 | 10/1998 |
| JP | 2001-202125 | 7/2001 |
| JP | 2001-317403 | 11/2001 |
| JP | 2002-342508 | 11/2002 |
| JP | 2003-178148 | 6/2003 |
| JP | 2004-299473 | 10/2004 |
| JP | 2008-1233 | 1/2008 |
| JP | 2009-146059 | 7/2009 |

OTHER PUBLICATIONS

CN Office Action for Chinese Application No. 200980161988.7, issued on Mar. 10, 2014.
Notification of Transmittal of Translation of the International Preliminary Report on Patentability, International application No. PCT/JP2009/068038, International filed—Oct. 19, 2009, Date of mailing—May 24, 2012.

\* cited by examiner

DIAGNOSIS SYSTEM AND DIAGNOSIS METHOD FOR CONSTRUCTION MACHINE

TECHNICAL FIELD

The present invention relates generally to systems and methods for diagnosing construction machine states. More particularly, the invention concerns a construction machine diagnosing system and method in which even a user who has little knowledge of any procedures or techniques for diagnosing construction machine states can effectively diagnose a desired machine according to particular characteristics of data relating to the machine.

BACKGROUND ART

During the diagnosis of a machine state using the data sent from a plurality of sensors mounted in and on the machine, optimal results cannot be obtained by merely entering the sensor data intact into a diagnosing program. To obtain the optimal results, it has been necessary to appropriately execute various procedural steps such as selecting appropriate sensor data to be used for the diagnosis, preprocessing the sensor data, selecting an appropriate technique for the diagnosis, and assigning appropriate parameters to be used in the diagnosing technique. Even for machines of the same model/type, criteria for judging whether the particular machine state is abnormal vary from machine to machine, depending on the manner and environment in which the machine is operated. Accordingly, there has also been a need to establish appropriate criteria. Knowledge of the analytical procedures, judgment criteria, and other factors involved in such diagnosis, is traditionally accumulated in the user who conducts the diagnosis, and the time required for the diagnosis changes significantly according to a particular magnitude of the user's knowledge. The user's knowledge has therefore been difficult to apply to construction machines that require rapid diagnosis.

In regard to these problems, Patent Document 1, for example, describes a technique that enables knowledge about past defects in a product to be readily acquired by saving the product's characteristics data and the number of defects which have occurred in the product until then, into a database and later retrieving this data from the database during the design of a new product.

In addition, Patent Document 2, for example, describes a technique for storing combinations each of a data analytical purpose and a data analytical method into a database and presenting one of the analytical methods, depending upon the analytical purpose entered from a user terminal during the data analysis.

PRIOR ART LITERATURE

Patent Documents

Patent Document 1: JP-10-275168-A
Patent Document 2: JP-10-232874-A

SUMMARY OF THE INVENTION

Problems to be Solved by the Invention

The technique for storing the combinations each of the product's characteristics and the number of defects and presenting the combinations to the user has only been intended to support design, and has therefore been inapplicable to diagnosing a state of a construction machine. In addition, the technique for presenting the analytical method based upon the analytical purpose of data has posed the following problem. If there exist a plurality of analytical methods that correspond to the analytical purpose, since the user needs to select an appropriate analytical method, a particular amount of the user's knowledge may cause the user to select an inappropriate analytical method and spend a more time than necessary to acquire correct analytical results.

An object of the present invention is to provide a construction machine diagnosing system and method in which even a user who has little knowledge of any procedures and techniques for diagnosing construction machines can speedily diagnose a desired machine in a manner appropriate for particular data characteristics of the machine.

Means for Solving the Problems

In order to achieve the above object, when a diagnosis device is used to conduct diagnosis, the present invention acquires the characteristics of entered diagnostic data and then acquires, from a diagnostic knowledge storage device, any diagnosing techniques considered to be effective for the characteristics of the diagnostic data.

Acquiring an effective diagnosing technique in this way according to the particular characteristics of the diagnostic data allows a user to diagnose a desired machine speedily in a manner appropriate for the data characteristics of the machine, even if the user has little knowledge of any procedures and techniques for diagnosing construction machines.

More specifically, the diagnosis device acquires the diagnostic data from the diagnostic data storage device and then extracts the number of parameters contained in the diagnostic data, the types of parameter sensors, and data characteristics that include characteristics of the parameters, from information contained in the diagnostic data. After the extraction, the diagnosis device further acquires, from the diagnostic knowledge storage device, any diagnosing techniques considered to be effective for the data characteristics as well as for a particular diagnostic purpose. Next, the diagnosis device presents acquisition results to the user along with an effective rate that is calculated from the number of application cases as well as the number of diagnosing techniques matching the data characteristics. After this, the user selects a diagnosing technique based upon the effective rate, and diagnoses the machine.

After the diagnosis, a combination of two factors, namely the characteristics of the diagnostic data to be used for the diagnosis, and the diagnosing technique determined to be effective for the diagnosis, is stored as diagnostic knowledge into the diagnostic knowledge storage device.

In order to make effective use of the diagnostic knowledge stored within the diagnostic knowledge storage device, the diagnosis device further classifies common data characteristics by elements of diagnosing techniques and stores the classified data characteristics and the elements of the diagnosing techniques, as new diagnostic knowledge.

Effects of the Invention

In accordance with the present invention, even a user who has little knowledge of any procedures and techniques for diagnosing construction machines can diagnose a desired machine speedily in the manner appropriate for the data characteristics of the machine.

BEST MODE FOR CARRYING OUT THE INVENTION

An embodiment of the present invention is described below. This embodiment does not limit the invention and may incorporate various changes and modifications without departing from the spirit of the invention.

Figure 1:
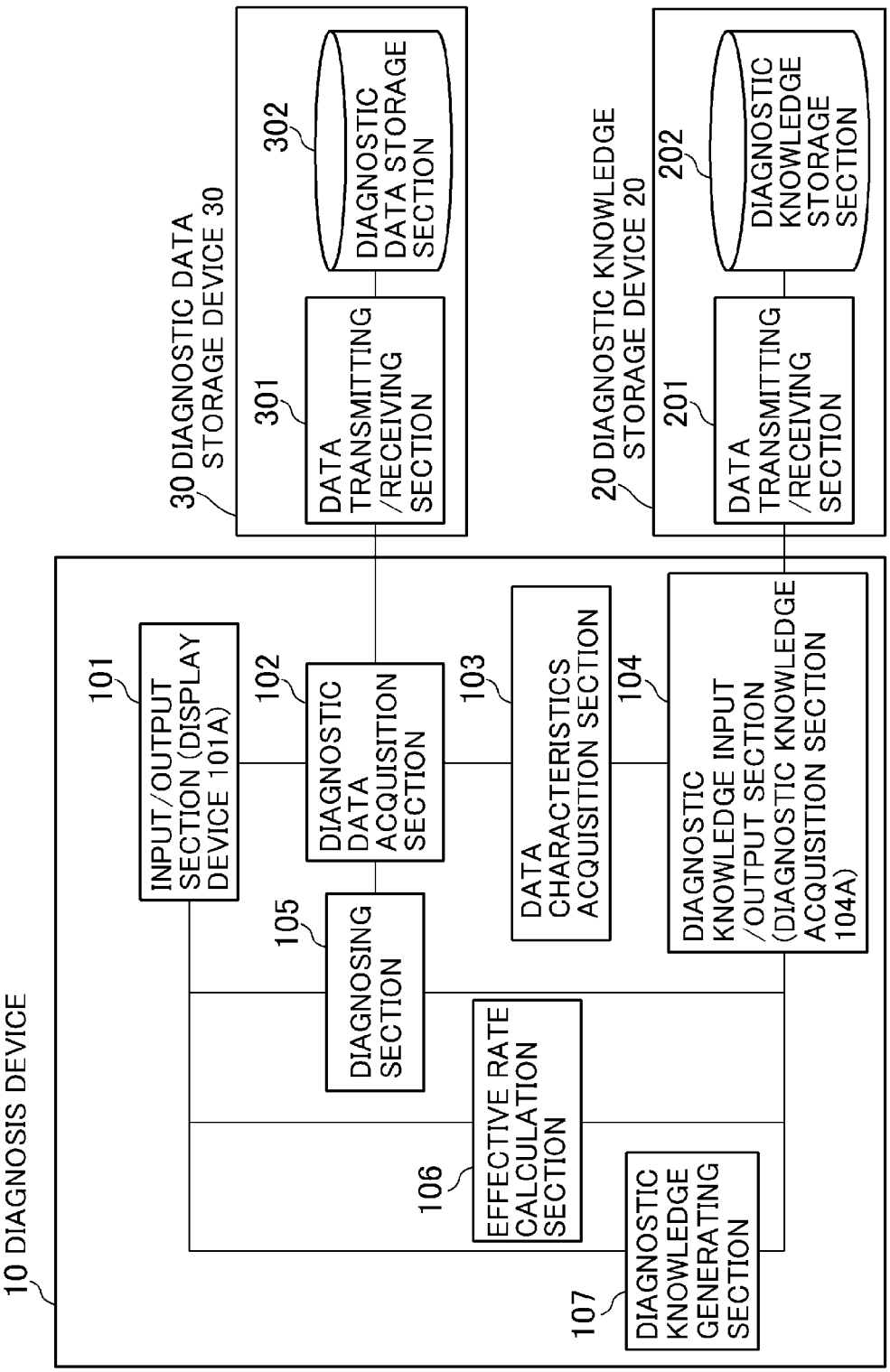
FIG. 1 is a diagram that illustrates a configuration of a diagnosis system applying a first embodiment of the present invention.

FIG. 1 is a configuration diagram of a construction machine diagnosis system applying the present embodiment of the invention.

The diagnosis system according to the present embodiment includes a diagnosis device 10, a diagnostic knowledge storage device 20, and a diagnostic data storage device 30, each of which is interconnected as shown by way of example in FIG. 1.

The diagnosis device 10 includes an input and output section 101 used to enter data and information from outside and to output results, a diagnostic data acquisition section 102 for acquiring diagnostic data from the diagnostic data storage device 30, and a data characteristics acquisition section 103 for acquiring data characteristics from the acquired diagnostic data. The diagnosis device 10 also includes a diagnostic knowledge input and output section 104, which has a function of a diagnostic knowledge acquisition section 104A to acquire from the diagnostic knowledge storage device 20 a diagnosing technique fitting the data characteristics acquired by the data characteristics acquisition section. In addition, the diagnosis device 10 includes a diagnosing section 105 having a diagnostic function that uses both the diagnostic data acquired by the diagnostic data acquisition section 102, and the diagnosing technique acquired by the diagnostic knowledge input and output section 104 (the diagnostic knowledge acquisition section 104A).

The input and output section 101 includes a display device 101A that displays an initial diagnostic screen (see FIG. 12), a diagnostic knowledge post-retrieval screen (see FIG. 12), a diagnostic result screen (see FIG. 13), and other various screens relating to diagnosis. The input and output section 101 also has an input device including a keyboard, a mouse, and the like.

After diagnosis, when the applied diagnosing technique, contained in diagnostic knowledge, is determined to be effective, the diagnosing section 105 additionally functions to store a combination of the diagnostic data characteristics and the applied diagnosing technique, as new diagnostic knowledge, from the diagnostic knowledge input and output section 104 into the diagnostic knowledge storage device 20.

The diagnosis device 10 further includes an effective rate calculation section 106 that calculates an effective rate of the diagnosing technique acquired by the diagnostic knowledge input and output section 104 (the diagnostic knowledge acquisition section 104A). Moreover, the diagnosis device 10 includes a diagnostic knowledge generating section 107. The diagnostic knowledge generating section 107 first collects, from the diagnostic knowledge stored within the diagnostic knowledge storage device 20, diagnostic knowledge that contains common elements (described later herein) of the diagnosing technique. Next, the diagnostic knowledge generating section 107 generates new diagnostic knowledge by combining the diagnosing technique elements and what the data characteristics contained in the collected diagnostic knowledge have in common, and then stores the combinations into the diagnostic knowledge storage device 20.

The diagnostic knowledge storage device 20 includes a data transmitting/receiving section 201 that exchanges data with the diagnosis device 10, and a diagnostic knowledge storage section 202 for storage of the diagnostic knowledge including the data characteristics and the diagnosing technique.

The diagnostic data storage device 30 includes a data transmitting/receiving section 301 that exchanges data with the diagnosis device 10, and a diagnostic data storage section 302 for storage of the diagnostic data such as sensor information and the machine operational data.

Figure 2:
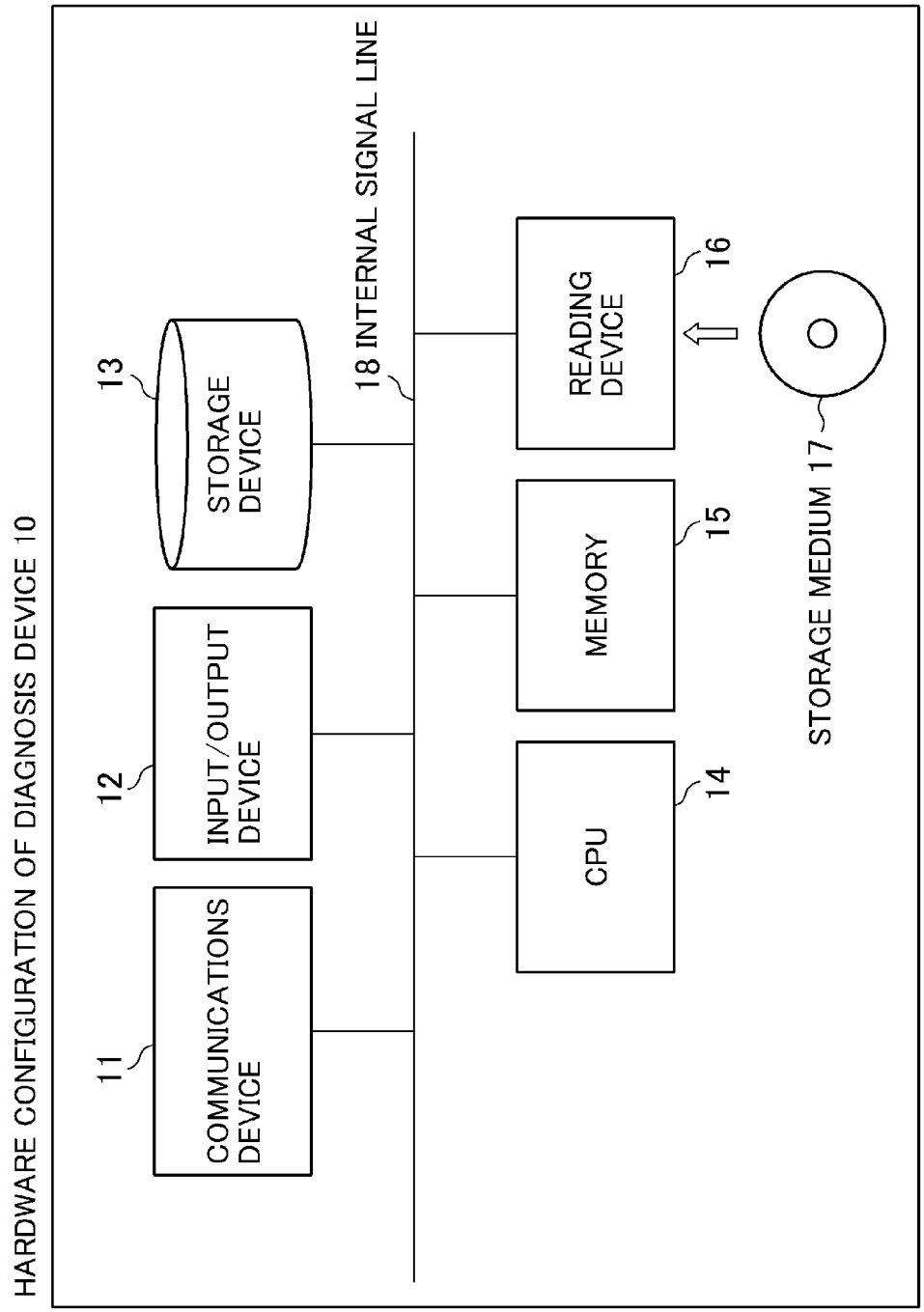
FIG. 2 is a diagram that shows a hardware configuration of a diagnosis device shown in FIG. 1.

FIG. 2 is a diagram that shows a hardware configuration of the diagnosis device 10. The diagnosis device 10 includes a communications device 11, an input and output device 12, a storage device 13, a CPU 14, a memory 15, and a reading device 16, each of which is coupled through an intercommunications line 18. The input and output device 12 corresponds to the input and output section 101 shown in FIG. 1. Similarly to the input and output section 101, therefore, the input and output device 12 includes a display device and an input device such as a keyboard and a mouse. The configuration shown in FIG. 2, also applies to the diagnostic knowledge storage device 20 and the diagnostic data storage device 30.

Process flow in the diagnosis system of the present embodiment is described below. Processing in this process flow is executed by various processing sections that will be realized on the devices 10, 20, 30 of the diagnosis system when programs stored within the storage devices of each device 10, 20, 30 are loaded into independent memories and executed by respective CPUs. The programs may each be prestored within the storage device, or each program may be introduced via any other storage medium or a communications medium (a network or a carrier propagating through the network) when necessary.

Figure 3:
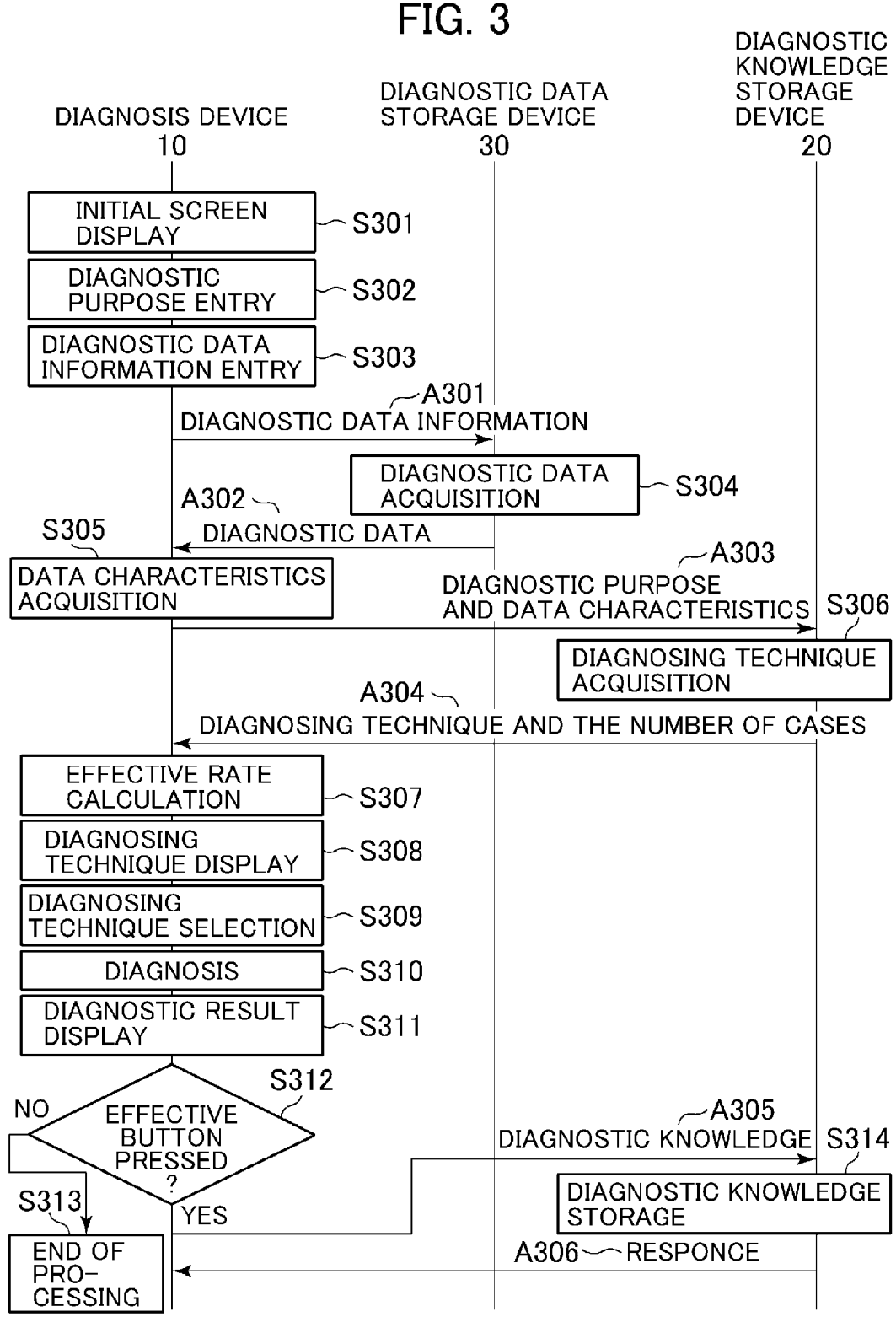
FIG. 3 is a diagram that shows an exemplary flow of diagnosis implemented in the diagnosis system applying the first embodiment of the present invention.

FIG. 3 is a diagram that shows a process flow of diagnosis implemented between the diagnosis device 10, the diagnostic knowledge storage device 20, and the diagnostic data storage device 30.

First, the diagnosis device 10 displays an initial diagnostic screen on the display device 101A of the input and output section 101 (step S301). The initial diagnostic screen includes items shown in FIG. 12. Details of this screen will be described later herein.

Next, a user uses the initial diagnostic screen to enter a diagnostic purpose from the input and output section 101 of the diagnosis device 10 (step S302). The diagnostic purpose here is information that identifies what type of machine is to be diagnosed, what state of the machine is to be diagnosed, what region of the machine is to be diagnosed with attention being focused upon what viewpoint, and/or other factors. For example, the information identifies diagnosing a state of a loader type of hydraulic shovel, diagnosing an engine heat balance in a hydraulic shovel, or diagnosing a pressure of a pump. The user next uses the initial diagnostic screen to enter diagnostic data information from the input and output section 101 of the diagnosis device 10 (step S303). The diagnostic data information discriminates the diagnostic data to be used for the diagnosis, and the information refers to, for example, a date, an acquisition location, an installation location, a serial code number of the machine, and the like. The user next transmits the diagnostic data information (A301) to the diagnostic data storage device 30. The transmission is conducted by, for example, pressing a SEARCH button displayed on the initial diagnostic screen.

Next, the diagnostic data storage device 30 acquires the desired diagnostic data from the diagnostic data storage section 302 (step S304) in accordance with the received diagnostic data information. The diagnostic data here is data having a structure shown in FIG. 5, details of this data being described later herein. The diagnostic data storage device 30 next transmits the acquired diagnostic data (A302) to the diagnostic data acquisition section 102 of the diagnosis device 10.

The data characteristics acquisition section 103 of the diagnosis device 10 then acquires data characteristics from the diagnostic data acquired by the diagnostic data acquisition section 102 (step S305). The data characteristics here is data having a structure shown in FIG. 7, details of this data being described later herein. Next, the diagnostic knowledge input and output section 104 transmits, to the diagnostic knowledge storage device 20, the diagnostic purpose that has been entered from the input and output section 101, and the data characteristics (A303) that the data characteristics acquisition section 103 has acquired (step S305).

After that, the diagnostic knowledge storage device 20 acquires only diagnosing techniques that match the diagnostic purpose received from the diagnostic knowledge storage section 202, and fit the data characteristics (step S306). The diagnostic knowledge storage section 202 at this phase retains diagnostic knowledge in the form of combinations of three factors, namely the data characteristics, the diagnosing techniques, and the number of application cases. A structure of the diagnostic knowledge will be described in detail later using FIG. 6. The diagnosing techniques fitting the data characteristics include not only those fully matching between the entered data characteristics and the data characteristics of the diagnostic knowledge, but also those partly matching between the two factors. In addition, each of the diagnosing techniques is data having a structure shown in FIG. 8, with its details being described later herein. Furthermore, the number of diagnosing techniques fitting the data characteristics can be either one or more.

Next, the diagnostic knowledge storage section 202 transmits the acquired diagnosing technique and the number of application cases (A304) to the diagnostic knowledge input and output section 104 (diagnostic knowledge acquisition section 104A) of the diagnosis device 10.

Next after the diagnostic knowledge acquisition section 104A has acquired the diagnosing technique, the effective rate calculation section 106 of the diagnosis device 10 calculates the effective rate of that diagnosing technique (step S307). The effective rate is calculated from a product of two values. One is a ratio between the number of elements in data characteristics input from the diagnostic knowledge input and output section 104 to the diagnostic knowledge storage device 20 in order to acquire from the device 20 the diagnostic knowledge fitting the data characteristics acquired by the data characteristics acquisition section 103, and the number of elements in the data characteristics contained in the diagnostic knowledge matching the data characteristics. The other is the number of application cases contained in the diagnostic knowledge matching the data characteristics.

After the above calculation, the diagnosis device 10 displays the diagnostic knowledge post-retrieval screen on the display device 101A of the input and output section 101, thereby presenting the diagnosing technique and the effective rate thereof to the user (step S308). The diagnostic knowledge post-retrieval screen is a screen having the items shown in FIG. 12. Details will be described later herein.

The diagnosing technique usually includes a plurality of steps (diagnosing technique elements), in which case, in step S308 the diagnosing technique and the effective rate are preferably displayed for each diagnosing technique element.

Next, the diagnosis device 10 prompts the user to select a diagnosing technique (step S309). If a plurality of diagnosing techniques exist at this time, five diagnosing techniques, for example, that are higher in the effective rate are displayed to limit the number of techniques presented. This display method avoids confusing the user. In addition, it is not absolutely necessary for the user to select a diagnosing technique in step S309; the device may automatically select a diagnosing technique having the highest effective rate.

After the above selection, the diagnosing section 105 of the diagnosis device 10 conducts the diagnosis based upon the user's selection result (step S310). A start of execution of the diagnosis is specified by, for example, pressing a DIAGNOSE button displayed on the diagnostic knowledge post-retrieval screen. Next, the diagnosing section 105 displays the diagnostic result screen on the display device 101A of the input and output section 101, thereby displaying diagnostic results to the user (step S311). The diagnostic result screen is a screen having items shown in FIG. 13, details of this screen being described later herein. After displaying this screen, the diagnosing section 105 determines whether an EFFECTIVE button in the diagnostic result screen is already pressed (step S312). If the EFFECTIVE button is not pressed, the diagnosing section 105 terminates processing (step S313). If the EFFECTIVE button is pressed, the diagnosing section 105 transmits the combination of the diagnostic data characteristics and the applied diagnosing technique, as new diagnostic knowledge (A305), to the diagnostic knowledge storage device 20 via the diagnostic knowledge input and output section 104. The user judges whether the diagnostic results are effective. When the diagnostic knowledge is generated, the number of application cases is regarded as 1.

Next, the diagnostic knowledge storage device 20 stores the received diagnostic knowledge (step S314) and then transmits a response (A306) to the diagnosis device 10.

Figure 4:
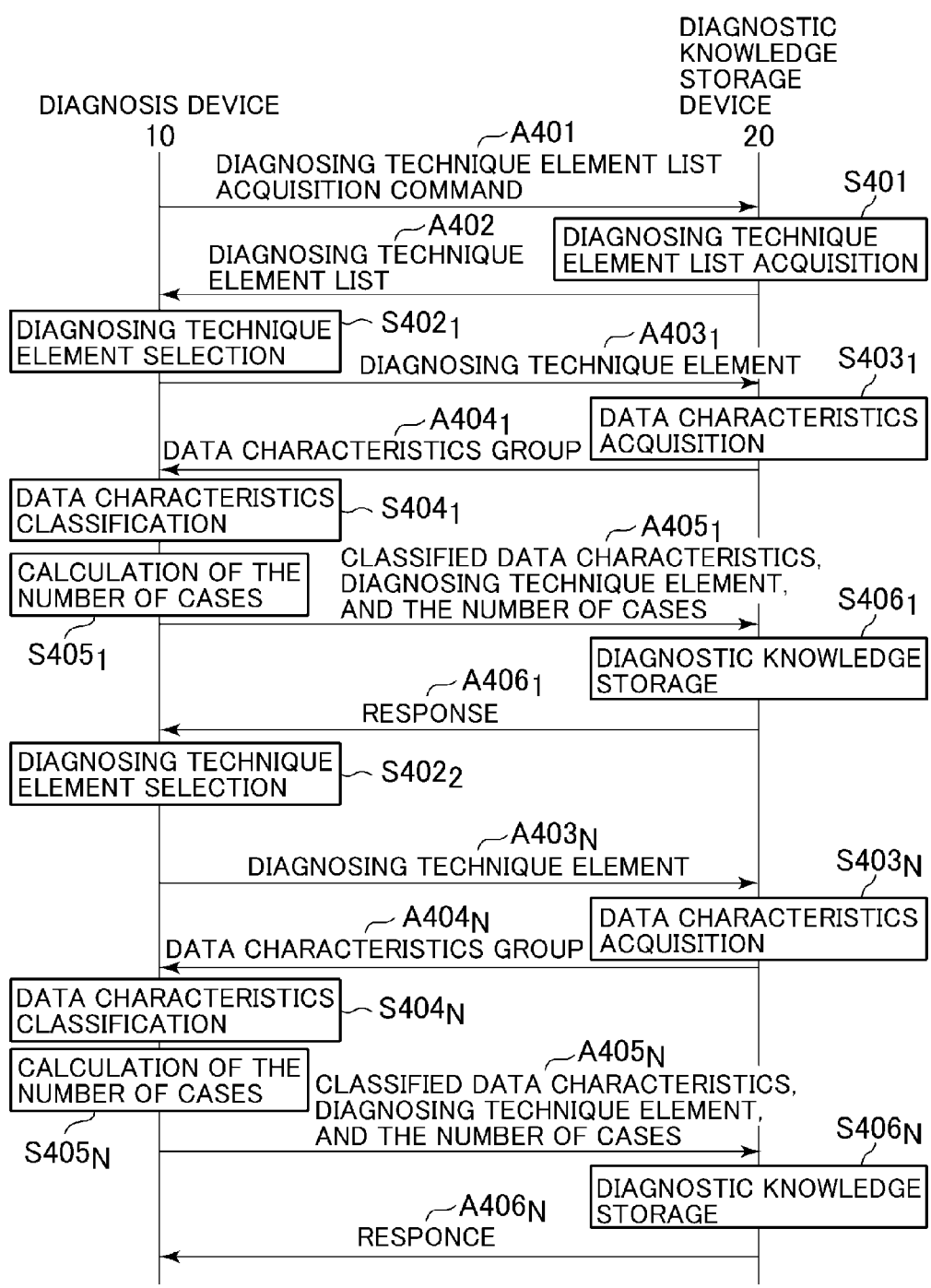
FIG. 4 is a diagram that shows an exemplary flow of optimization by a diagnostic knowledge storage device, implemented in the diagnosis system applying the first embodiment of the present invention.

FIG. 4 is a flow diagram that shows an optimization sequence executed by the diagnostic knowledge generating section 107 of the diagnosis device 10 in order to improve usage efficiency of the diagnostic knowledge stored within the diagnostic knowledge storage device 20.

First, the diagnostic knowledge generating section 107 transmits a diagnosing-technique element list acquisition command (A401) to the diagnostic knowledge storage device 20, thereby requesting the device 20 to acquire a list of diagnosing technique elements. The diagnosing technique, as described above, usually includes a plurality of steps (diagnosing technique elements), and each of the steps (diagnosing technique elements) in the diagnosing technique is subdivided into a plurality of further detailed specific elements. The diagnosing technique elements, acquired as the diagnosing-technique element list, mean the further detailed specific elements contained in the steps (diagnosing technique elements). For example, if the diagnosing technique elements relate to a parameter-preprocessing method, the diagnosing technique elements acquired will include, for example, fast Fourier transformation (FFF) and selection of a maximum value.

Next, the diagnostic knowledge storage device 20 searches the diagnostic knowledge storage section 202 and acquires the diagnosing-technique element list therefrom (step S401). The diagnostic knowledge storage device 20 transmits the acquired diagnosing-technique element list (A402) to the diagnostic knowledge generating section 107 of the diagnosis device 10.

After this, the diagnostic knowledge generating section 107 selects diagnosing technique elements from the received list of diagnosing technique elements and transmits the selected elements (A403$_1$) to the diagnostic knowledge storage device 20 (step S402$_1$). Diagnosing technique elements are selected for each of the diagnosing technique elements as the diagnosing technique steps, and the selection is conducted by the diagnostic knowledge generating section 107 in a sequence predetermined for the specific elements contained in each diagnosing-technique element.

Next, the diagnostic knowledge storage device 20 acquires, from the diagnostic knowledge storage section 202, data characteristics corresponding to the received diagnosing technique elements (step S403$_1$). The acquired data characteristics (A404$_1$) are then transmitted as one group to the diagnostic knowledge generating section 107 of the diagnosis device 10.

Next, the diagnostic knowledge generating section 107 extracts only characteristics having common elements, from the received entire data characteristics group and classifies the extracted data characteristics (step S404$_1$). The number of application cases is next calculated using the number of elements contained in each classified characteristic (step S405$_1$). A method of classifying the characteristics, and a method of calculating the number of application cases are illustrated in detail in FIG. 11. Next, three factors (A405$_1$), that is, the classified data characteristics, the diagnosing technique elements, and the number of application cases, are transmitted to the diagnostic knowledge storage device 20.

Next after receiving the combination of the classified data characteristics, the diagnosing technique elements, and the number of application cases, the diagnostic knowledge storage device 20 stores the combination as new diagnostic knowledge into the diagnostic knowledge storage section 202 (step S406$_1$). Next, the diagnostic knowledge storage device 20 transmits a response (A406$_1$) that denotes storage results, to the diagnostic knowledge generating section 107 of the diagnosis device 10.

If a plurality of diagnosing technique elements exist, the optimization sequence in the diagnostic knowledge storage device 20 can be implemented by repeating steps A402$_1$ to A406$_1$. The above process may be executed either before or after step S304 shown in FIG. 3, or may be repeated periodically at fixed time periods. In addition, the process may be conducted inside the diagnosing knowledge storage device 20 or between the diagnosing knowledge storage device 20 and a device other than the diagnosis device 10.

Even if the amount of diagnostic knowledge stored within the diagnosing knowledge storage device 20 is insufficient, executing the above optimization sequence enables the diagnosis device 10 to present an effective diagnosing technique for partial characteristics of the data entered, and thus enhances the usage efficiency of the diagnostic knowledge.

Authentication, signature verification, data encryption, or other process steps are not shown in the process flow diagrams of FIGS. 3 and 4. To ensure a higher level of data security, however, these process steps may be inserted between those conducted in the diagnosis device 10 and the diagnosing data storage device 30, and between the diagnosis device 10 and the diagnosing knowledge storage device 20.

Figure 5:
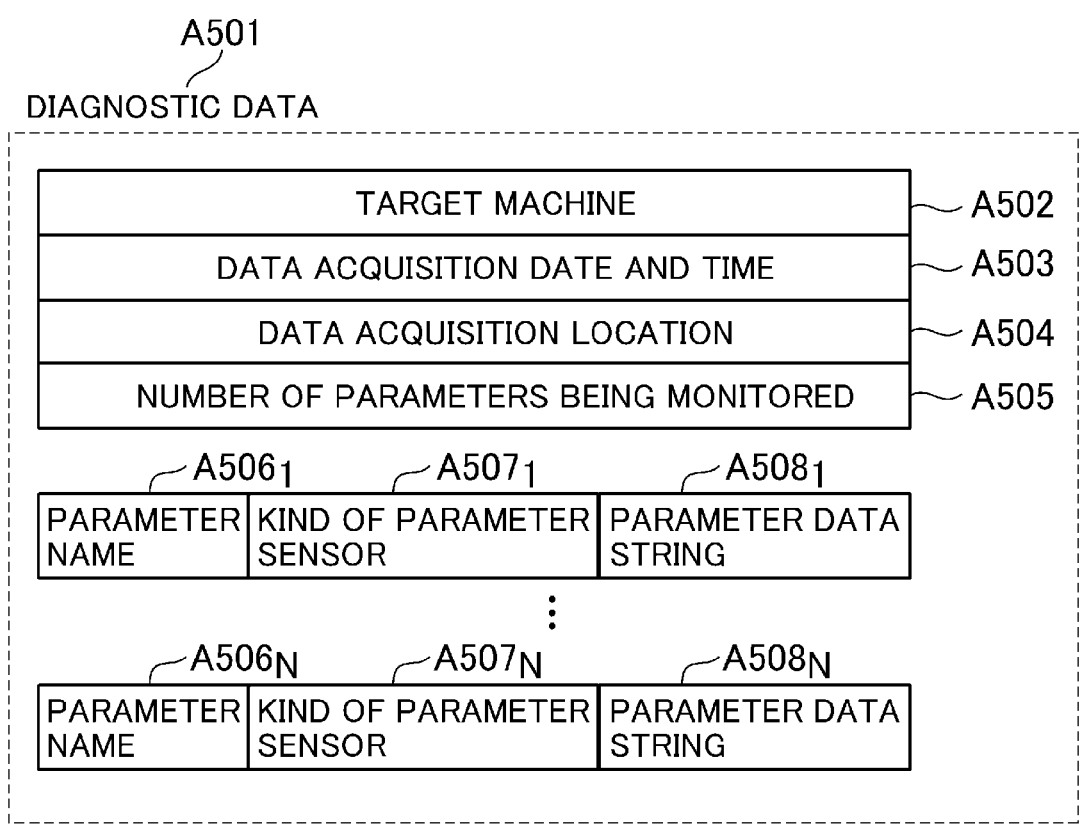
FIG. 5 is a diagram that shows an exemplary structure of diagnostic data used in the first embodiment of the present invention.

FIG. 5 is a diagram that shows a detailed structure of the diagnostic data acquired as A302 in step S303 of FIG. 3. Reference number A501 in FIG. 5 denotes the diagnostic data.

The diagnostic data A501 includes the following items: "Target machine" (A502), which denotes the kind and name of machine being diagnosed, "Data acquisition date and time" (A503), which denotes the date and time when the diagnostic data was acquired, "Data acquisition location" (A504), which denotes a location at which the data was acquired, "Number of parameters being monitored" (A505), which denotes the number of sensors being used to monitor parameters in the target machine, "Parameter name" (A506$_1$), which denotes a name of a monitoring parameter, "Kind of parameter sensor" (A507$_1$), which denotes the kind of sensor monitoring the parameter, and "Parameter data string" (A508$_1$), which denotes the data actually monitored. When a plurality of parameters to be monitored are present, the above data structure includes A506$_1$ to A508$_1$ elements as many as there actually are parameters, but with respective last digits incremented by 1 as shown. The diagnostic data does not need to include all of the above constituent elements and can only include at least one of them. In addition, arrayal order of the diagnostic data elements is not limited to that shown in FIG. 5.

Figure 6:
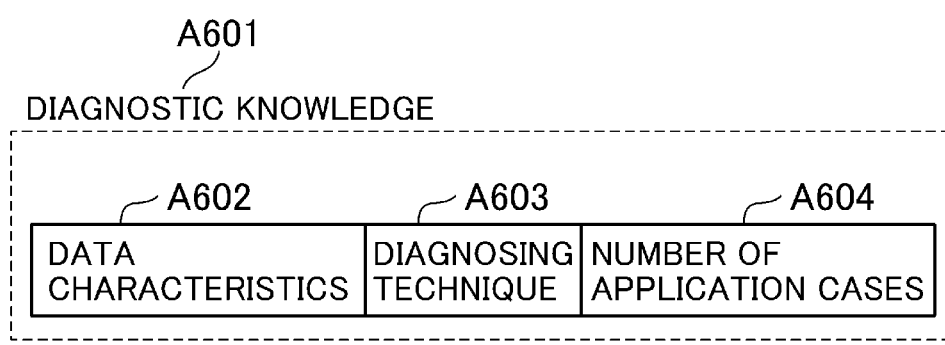
FIG. 6 is a diagram that shows an exemplary structure of diagnostic knowledge used in the first embodiment of the present invention.

FIG. 6 is a diagram that shows the structure of the diagnostic knowledge stored into the diagnostic knowledge storage section 202.

The diagnostic knowledge (A601) includes the following elements: "Data characteristics" (A602), acquired from diagnostic data, "Diagnosing technique" (A603), which denotes the diagnosing technique where the diagnostic data has been used effectively for the diagnosis, and "Number of cases" (A604), which denotes the number of cases which include the combination of the data characteristics and the diagnosing technique. Further detailed structures of the data characteristics and the diagnosing technique will be described later herein FIGS. 7 and 8, respectively. A method of calculating the number of cases will be described in FIG. 11. Arrayal order of the diagnostic knowledge elements is not limited to that shown in FIG. 6; it only suffices if the diagnostic knowledge contains at least the elements described above.

Figure 7:
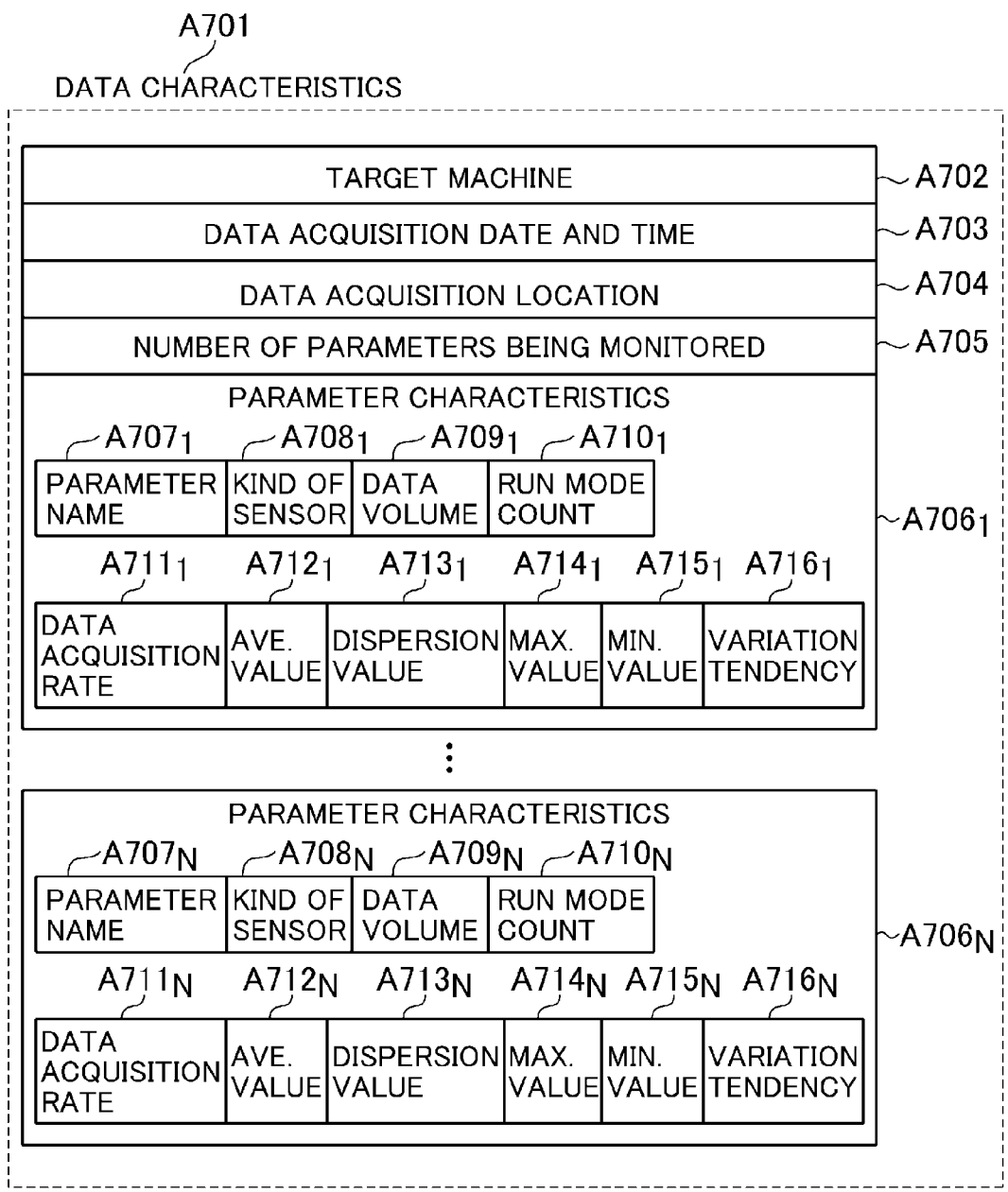
FIG. 7 is a diagram that shows an exemplary structure of data characteristics used in the first embodiment of the present invention.

FIG. 7, a diagram of the data characteristics A602 in FIG. 6, shows the detailed structure of the data characteristics acquired in step S304 of FIG. 3. Reference number A701 in FIG. 7 denotes the data characteristics.

The data characteristics A701 include the following items: "Target machine" (A702), which denotes the kind and name of machine being diagnosed, "Data acquisition date" (A703), which denotes the date and time when the diagnostic data was acquired, "Data acquisition location" (A704), which denotes a location at which the data was acquired, "Number of parameters being monitored" (A705), which denotes the number of parameters being monitored or of sensors being used to monitor the parameters, in the target machine, and "Parameter characteristics" ($A706_1$), which denotes characteristics of one parameter being monitored. The "Parameter characteristics" includes: "Parameter name" ($A707_1$), which denotes a name of the parameter, "Kind of sensor" ($A708_1$), which denotes the kind of sensor for which the parameter has been created, "Data volume" ($A709_1$), which denotes a data volume of the parameter, "Run mode count" ($A710_1$), which denotes a parameter data execution mode count, "Data acquisition rate" ($A711_1$), which denotes how often the parameter was acquired, "Average value" ($A712_1$), which denotes an average value of the parameter, "Dispersion value" ($A713_1$), which denotes a dispersion value of the parameter, "Maximum value" ($A714_1$), which denotes a maximum value of the parameter, "Minimum value" ($A715_1$), which denotes a minimum value of the parameter, and "Variation tendency" ($A716_1$), which denotes a variation tendency of the parameter. When a plurality of parameters to be monitored are present, the above data structure includes $A707_1$ to $A716_1$ elements as many as there actually are parameters, but with respective last digits incremented by 1 as shown. The run mode count here is calculated from the number of occurrence of discrete changes found through data string analysis of the parameters. For example, if a value of 0 at time "t" changes to 100 at time "t+1," the run mode count is increased by 1 assuming that the particular run mode has changed. This calculation method is used to confirm all data strings and calculate the run mode count. A threshold level for detecting a change in run mode slightly differs according to the kind of data. However, a reference value of at least 10 is used as an indicator of a variation of at least 10 in normalized data string per unit time. A method useable to achieve the normalization would be by using the maximum and/or minimum values of the parameter or by using the average or dispersion value thereof, but is not limited to these methods. In addition, the variation tendency, meaning a tendency for the parameter to change with time, refers to, for example, a monotonic increase or a monotonic decrease. Depending upon a spread of the dispersion value at various data points, such a tendency as towards a monotonic increase or monotonic decrease, a tendency close to a normal distribution, or the like is extracted and the extracted tendency is incorporated into the data structure. The data characteristics do not need to include all of the above constituent elements and can only include at least one of them. In addition, arrayal order of the data characteristics elements is not limited to that shown in FIG. 7.

Figure 8:
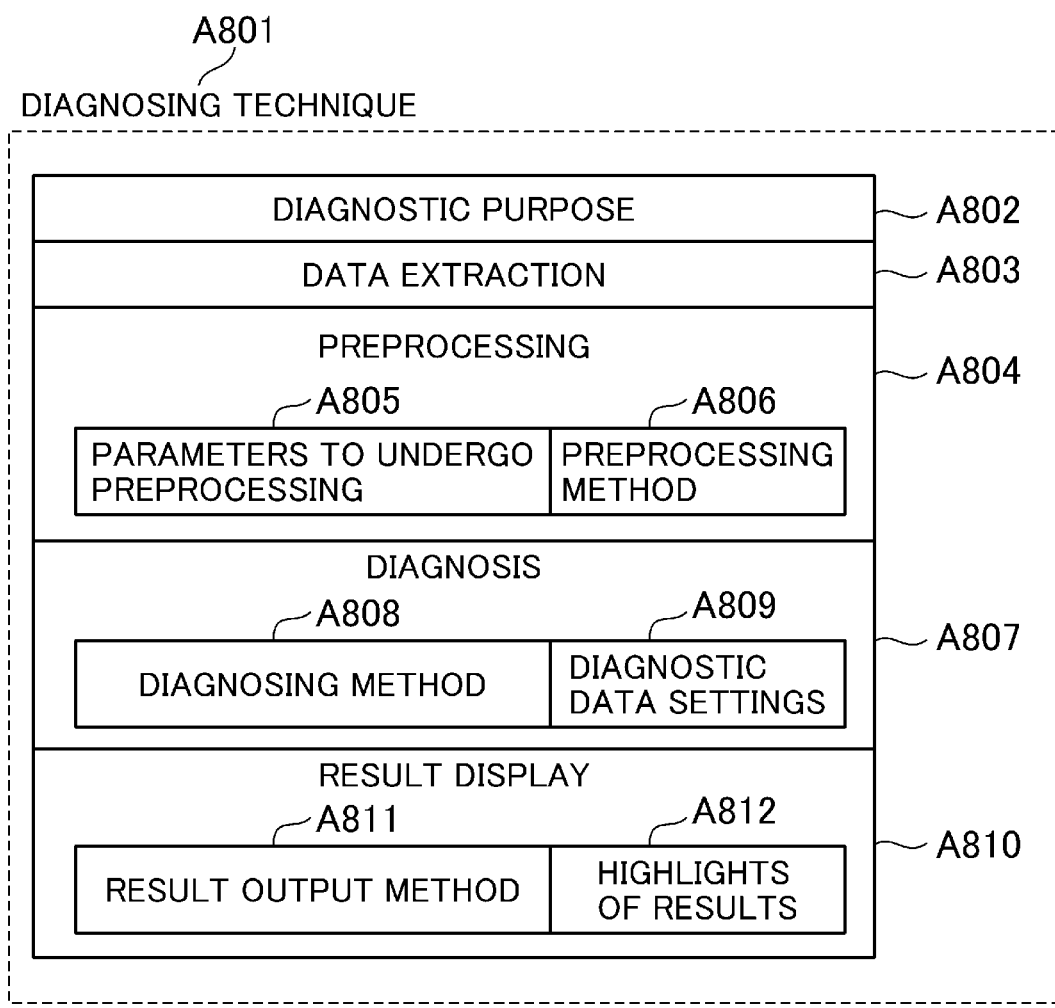
FIG. 8 is a diagram that shows an exemplary structure of a diagnosing technique used in the first embodiment of the present invention.

FIG. 8, a diagram of the diagnosing technique A603 in FIG. 6, shows the detailed structure of the diagnosing technique acquired in step S305 of FIG. 3. Reference number A801 in FIG. 8 denotes the diagnosing technique.

The diagnosing technique A801 includes "Diagnostic purpose" (A802), which denotes a purpose of the diagnosis, "Data extraction" (A803), which denotes a list of parameters used for the diagnosis, "Preprocessing" (A804), which denotes prior processing of each parameter, "Diagnosis" (A807), which denotes a state-diagnosing technique, and "Result display" (A810), which denotes a method of displaying diagnostic results. "Preprocessing" (A804) includes "Parameters to undergo preprocessing" (A805), which denotes a combination of the parameters to undergo preprocessing, and "Preprocessing method" (A806), which denotes a method of preprocessing conducted for the combination. When a plurality of parameters to be monitored are present, the above data structure includes A805 and A806 elements as many as there actually are parameters. "Diagnosis" (A807) includes "Diagnosis method" (A808), which identifies whether the diagnosis employs threshold data determination, clustering, correlation distribution, or the like, and "Diagnostic data settings" (A809), which denotes threshold levels, the number of clusters, weighting values, and/or other data settings. "Result display" (A810) includes "Result output method" (A811), which denotes a way to output diagnostic results such as text, line graph, or bar graph, and "Highlights of results" (A812), which denotes major points upon which attention is to be focused during output result reviews for state discrimination. The diagnosing technique does not need to include all of the above constituent elements and can only include at least one of them. In addition, arrayal order of the diagnosing technique elements is not limited to that shown in FIG. 8.

Figure 9:
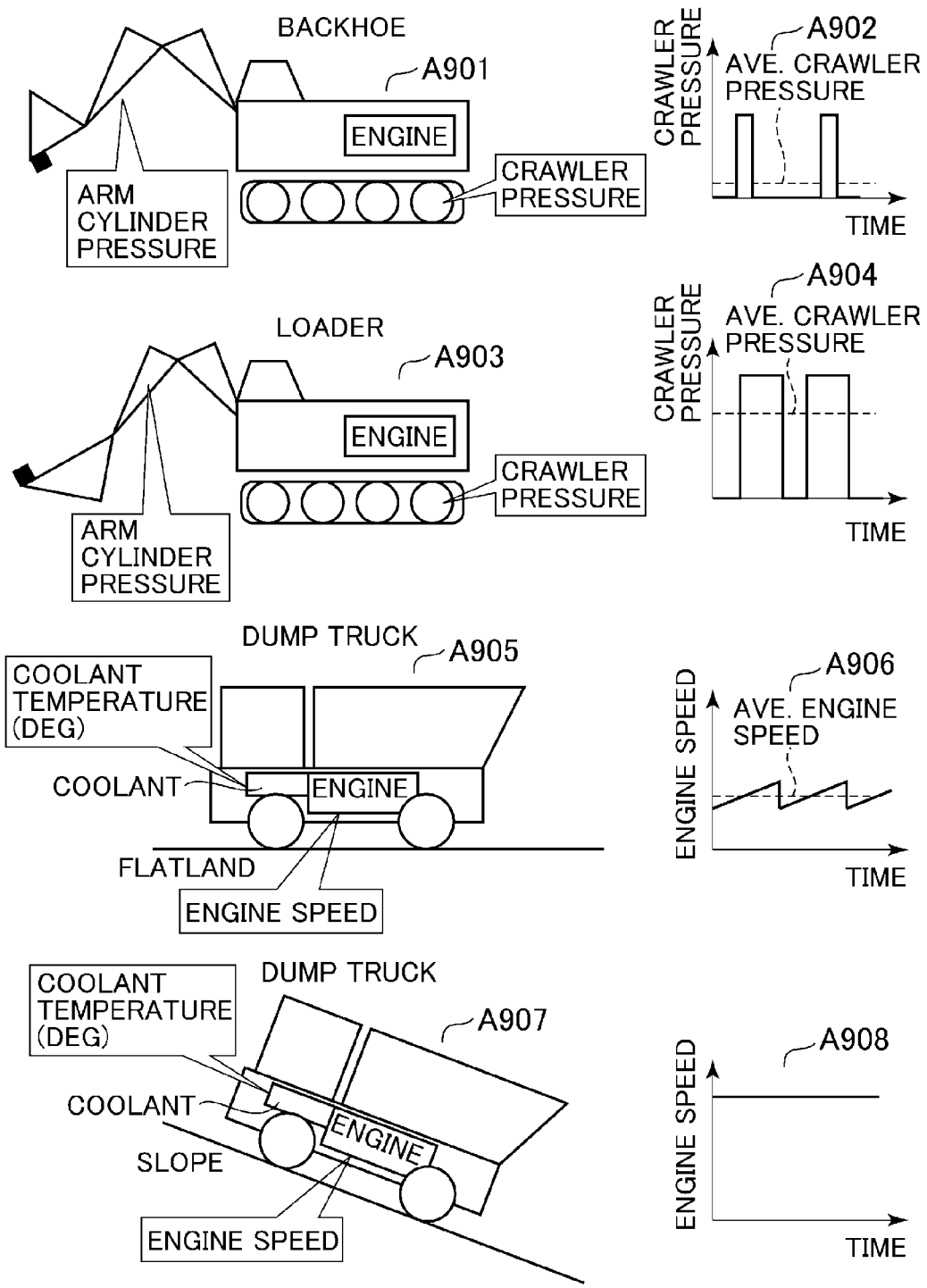
FIG. 9 is a diagram that shows examples of construction machines, used in specific diagnostic cases in the first embodiment of the present invention.

FIG. 9 is a diagram that shows examples of construction machines, used for describing specific diagnostic cases.

Two kinds of hydraulic shovels and two kinds of dump trucks are diagnosed in the examples. The hydraulic shovels are a backhoe (A901) that swings a bucket downward from above to excavate the ground and scoop it away, and a loader (A903) that swings a bucket upward from below for excavation. These machines have the following features and characteristics. The backhoe, since it hardly uses crawlers, is substantially free from changes in crawler pressure, tending to operate at a low average crawler pressure (A902). The loader, which uses crawlers very frequently for excavation, significantly changes in crawler pressure, tending to operate at a high average crawler pressure (A904). The crawler pressure is a driving pressure of a cylinder provided to control crawler tension.

Next, one of the two kinds of dump trucks is a dump truck (A905) that travels across flatlands to carry the sediment/soil excavated by a hydraulic shovel, and the other type is a dump truck (A907) that travels along slopes to carry excavated sediment/soil. These dump trucks have the following features and characteristics. Because of its insignificant engine load, the dump truck that travels across flatlands has a tendency to operate at a low average engine speed (A906), whereas the dump truck (A907) that travels along slopes inevitably operates at a high average engine speed (A908) because of a significant engine load.

Figure 10A:
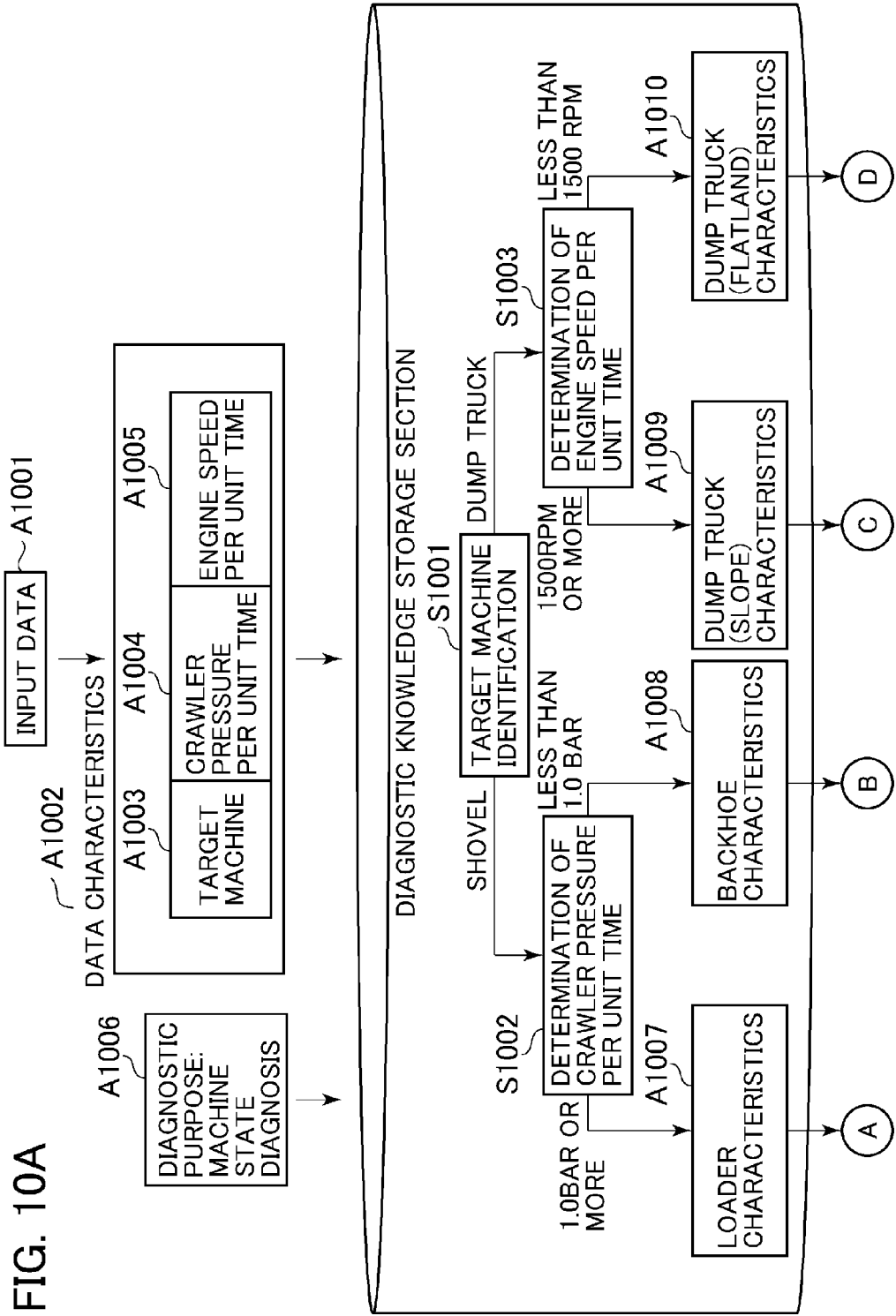
FIGS. 10A and 10B are diagrams that show an exemplary flow of diagnostic technique extraction in specific diagnostic cases in the first embodiment of the present invention.
Figure 10B:
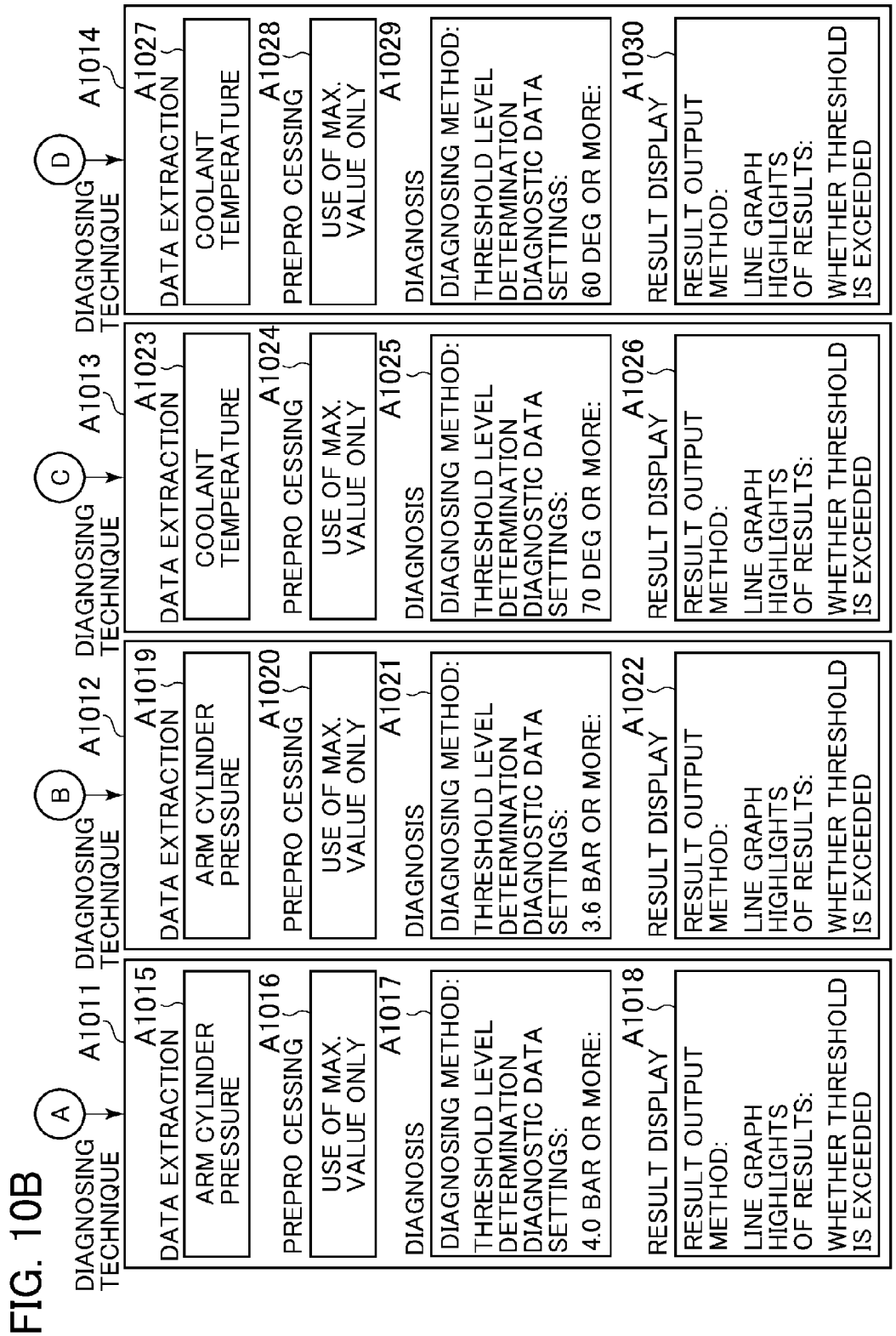

FIGS. 10A and 10B are diagrams that illustrate a process flow of deriving a diagnostic technique from input data to diagnose states of the construction machines shown in FIG. 9, the diagram showing an example of a processing sequence in steps S301 to S305 of FIG. 3.

First, data to be used for the diagnosis is input as A1001 to the data characteristics acquisition section 103.

Next, characteristics (A1002) of the input data are extracted. The data characteristics extracted here are those required for retrieval of diagnostic knowledge, and these characteristics are constituted by three elements, namely, "Target machine" (A1003), "Crawler pressure per unit time"

(A1004), and "Engine speed per unit time" (A1005). Next, "Diagnostic purpose" (A1006) and the acquired "Data characteristics" (A1002) are input to the diagnostic knowledge storage section 202. The diagnostic knowledge storage section 202 then extracts a diagnosing technique that fits the input "Diagnostic purpose" (A1006) and "Data characteristics" (A1002). More specifically, the machine to be diagnosed, or "Target machine," is discriminated first (step S1001). If the target machine is a hydraulic shovel, reference is made to an average crawler pressure per unit time (step S1002). As a result, if the crawler pressure per unit time is 1.0 bar or more, this value is determined to apply to the loader characteristics (A1002), such that a diagnosing technique that has in the past proved effective for the characteristics is extracted as element A1011. If the crawler pressure per unit time is less than 1.0 bar, this value is determined to apply to the backhoe characteristics (A1003), such that a diagnosing technique that has in the past proved effective for the characteristics is extracted as element A1012. Conversely if the target machine is a dump truck, reference is made to an average engine speed per unit time in the input data (step S1002). As a result, if the engine speed per unit time is 1,500 rpm or more, since this value is determined to apply to characteristics (A1004) of the dump truck which travels along slopes, a diagnosing technique that has in the past proved effective for the characteristics is extracted as element A1013. If the engine speed per unit time is less than 1,500 rpm, since this value is determined to apply to characteristics (A1005) of the dump truck which travels across flatlands, a diagnosing technique that has in the past proved effective for the characteristics is extracted as element A1014.

The diagnosing technique (A1011) that has been extracted for the loader includes: extracting arm cylinder pressure data during data extraction (A1015); acquiring a maximum value as preprocessing (A1016); determining, as a diagnostic item, whether the arm cylinder pressure exceeds a threshold level of 4.0 bar (A1017); and using a line chart as a result output method and focusing attention upon the fact that the threshold level has been exceeded (A1018). The diagnosing technique (A1012) that has been extracted for the backhoe, on the other hand, includes: extracting arm cylinder pressure data during data extraction (A1019); acquiring a maximum value as preprocessing (A1020); determining, as a diagnostic item, whether the arm cylinder pressure exceeds a threshold level of 3.6 bar (A1021); and using a line chart as a result output method and focusing attention upon the fact that the threshold level has been exceeded (A1022). In the loader type of hydraulic shovel, since excavation usually requires the use of the arm more frequently than in the backhoe type of hydraulic shovel, the threshold level of the arm cylinder pressure is higher than in the backhoe type of hydraulic shovel.

The diagnosing technique (A1013), extracted for the dump truck that travels along slopes, includes: extracting coolant temperature data during data extraction (A1023); acquiring a maximum value as preprocessing (A1024); determining, as a diagnostic item, whether the coolant temperature exceeds a threshold level of 70 deg (A1025); and using a line chart as a result output method and focusing attention upon the fact that the threshold level has been exceeded (A1026). The diagnosing technique (A1014), extracted for the dump truck that travels across flatlands, includes: extracting coolant temperature data during data extraction (A1027); acquiring a maximum value as preprocessing (A1028); determining, as a diagnostic item, whether the coolant temperature exceeds a threshold level of 60 deg (A1029); and using a line chart as a result output method and focusing attention upon the fact that the threshold level has been exceeded (A1030). The dump truck that travels along slopes has a tendency to increase in engine speed by necessity because of slope traveling and thus increase in coolant temperature with increases in the amount of heat released from the engine. For this reason, the threshold level of the coolant temperature is higher than in the dump truck that travels across flatlands.

Each diagnosing technique that was thus extracted is output to the display device 101A, as described, and then the diagnosing technique is displayed on the diagnostic knowledge post-retrieval screen and used for the diagnosis.

In this way, even for the hydraulic shovels, dump trucks, or other construction machines of the same category, more accurate diagnosis of states than in conventional techniques can be implemented by switching the diagnosing technique as appropriate according to the particular operating environment or characteristics of the construction machine.

While the example in FIGS. 10A and 10B applies to extracting one effective diagnosing technique based on the characteristics of the construction machine to be diagnosed, a plurality of effective diagnosing techniques, if any, may be extracted. In this case, as described above, the degrees of effectiveness of the diagnosing techniques will be calculated and five higher degrees of effectiveness, for example, will be displayed to limit the number of techniques presented.

Figure 12:
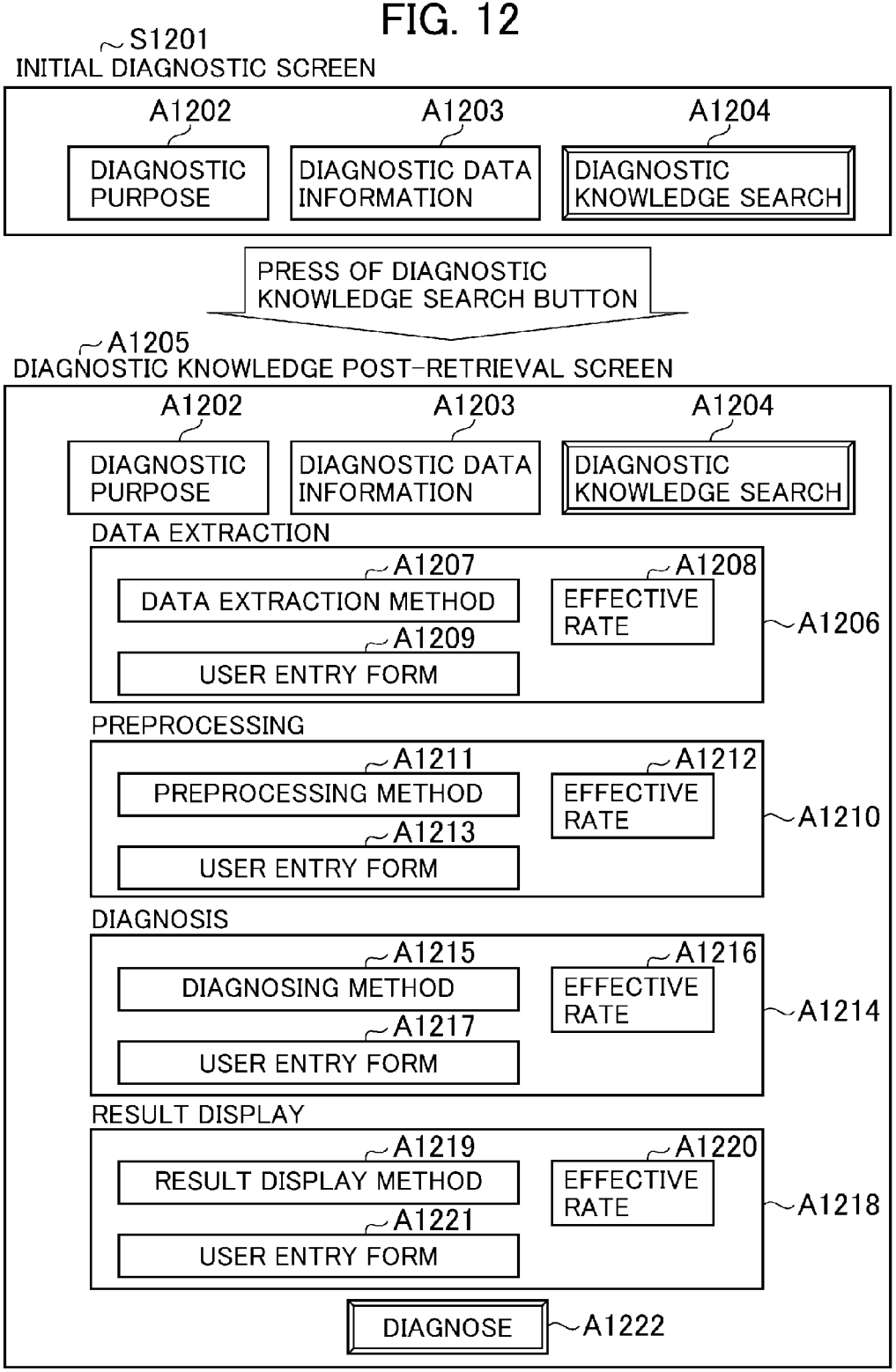
FIG. 12 is a diagram that shows an example of an interface screen presented to a user before the diagnosis is started in the first embodiment of the present invention.

In addition, while the example in FIGS. 10A and 10B applies to extracting a diagnosing technique that includes data extraction, preprocessing, diagnosis, and result display, as a set of diagnosing technique elements, if the diagnostic knowledge that the diagnostic knowledge generating section 107 has generated is stored within the diagnostic knowledge storage device 20, each element of the diagnosing technique may be extracted independently, as shown in FIG. 12.

Furthermore, while the example in FIGS. 10A and 10B applies to conducting an independent diagnosis upon each kind of machine such as a hydraulic shovel or dump truck, with a purpose of diagnosing the states of each machine of that kind, the diagnosis may be conducted to diagnose a state of a specific region (such as engine or pump) of a specific type of machine (such as the loader type of hydraulic shovel) or to diagnose with attention focused upon a specific aspect of the specific region (such as the engine heat balance in a hydraulic shovel and diagnosing a pressure of a pump).

Figure 11:
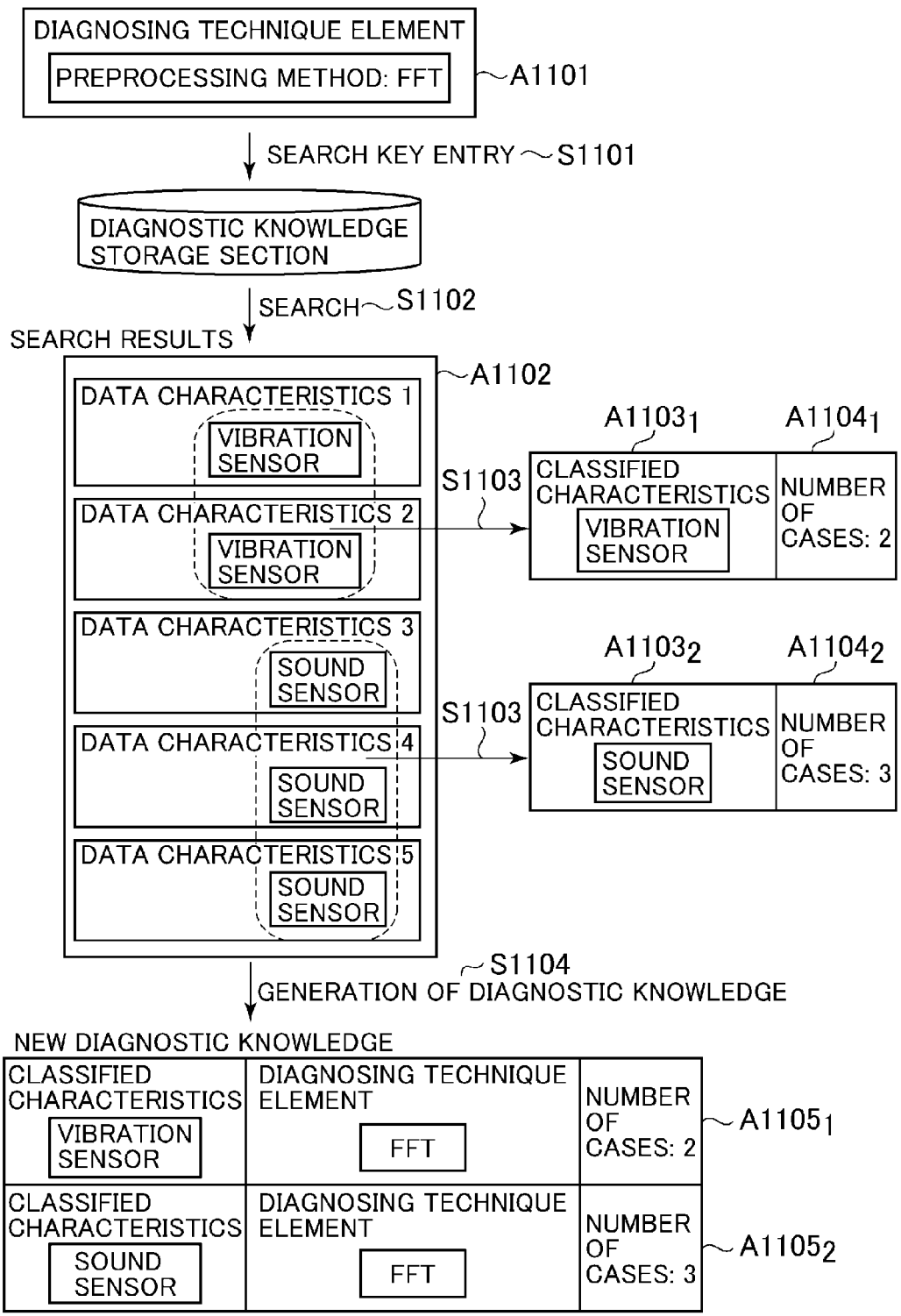
FIG. 11 is another diagram that shows the exemplary flow of the optimization by the diagnostic knowledge storage device, implemented in the diagnosis system applying the first embodiment of the present invention.

FIG. 11 is another diagram that shows more specific examples of a method for acquiring classified characteristics in step S404 and a method of calculating the number of application cases in step S405 of FIG. 4.

Fast Fourier Transformation (FFF), which is one method of preprocessing, is described as an example of a diagnosing technique element below. First, FFT (A1101) that is one preprocessing method is input as a search key to the diagnostic knowledge storage section 202 (step S1101: corresponds to step S402 in FIG. 4). Next, the diagnostic knowledge storage section 202 is searched for data characteristics associated with FFT (step S1102: corresponding to step S403 in FIG. 4). Suppose here that five kinds of data characteristics are output as search results (A1102). After this, elements common to the output data characteristics are extracted and classified (step S1103: corresponding to step S404 in FIG. 4). Let, here, one characteristic of a vibration sensor ($A1103_1$) be extracted as a first classified characteristic, and one characteristic of a noise sensor ($A1103_2$) as a second classified characteristic. In step S1103 corresponding to step S404 in FIG. 4, the number of data characteristics including the two extracted characteristics classifications is calculated as the number of application cases ($A1104_1$, $A1104_2$) (corresponding to step S405 in FIG. 4). In this example, the number of application cases of 2 is calculated as $A1104_1$ for the classified characteristic of "vibration sensor," and the number of application cases of 3 is calculated as $A1104_2$ for the classified characteristic of "noise sensor." Next, in step S1104 corresponding to step S406 in FIG. 4, the extracted characteristics classifications ($A1103_1$), $A1103_2$), the diagnosing technique element (A1101), the number of application cases ($A1104_1$), and the number of application cases ($A1104_2$) are combined to generate new diagnostic knowledge ($A1105_1$, $A1105_2$). Although data characteristics, not numerical values, have been described as an example above, with numerical values, even if it is not matched, can be regarded as having a common characteristic, and correspondingly classified. For example, if a diagnosing technique element effective for data whose maximum values are 50 and 60 exists, the maximum value of the data ranges between 50 and 60, characteristics to be classified are generated since the diagnosing technique element is regarded as effective for the particular data. Implementing such a process flow allows extraction of the data characteristics for which each diagnosing technique element can be effectively used, and thus allows expansion of diagnostic knowledge in applicability.

FIG. 12 is a conceptual diagram representing a screen presented before the user starts the diagnosis using the diagnosis device 10.

The initial diagnostic screen (A1201), displayed in step S301 of FIG. 3, includes a form (A1202) for entering a diagnostic purpose, a form (A1203) for entering information on diagnostic data to be used for the diagnosis, and a diagnostic knowledge retrieval button (A1204) for acquiring diagnostic data from the diagnostic data storage device 30, based upon the information entered on the form, and retrieving from the diagnostic knowledge storage section 202 the diagnostic knowledge considered to be effective for the acquired diagnostic data. The constituent elements of the initial diagnostic screen are not limited to the above and if functionality of the constituent elements can be implemented, the number of forms and buttons is arbitrary.

Next, a description is given below of the diagnostic knowledge post-retrieval screen (A1205) displayed after a press of the diagnostic knowledge retrieval button (A1204). The diagnostic knowledge post-retrieval screen (A1205), displayed in step S308 of FIG. 3, includes the following elements in addition to the constituent elements of the initial diagnostic screen (A1201): from top in order in accordance with an execution sequence relating to the diagnosis, "Data extraction" (A1206), "Preprocessing" (A1210), "Diagnosis" (A1214), "Result display" (A1218), and a DIAGNOSE button (A1222) for conducting the diagnosis based upon the entered diagnostic information. "Data extraction" (A1206) includes three elements. One is a data extraction method (A1207), denoting, among the diagnostic data, only the to-be-extracted data matching the diagnostic purpose and the data characteristics. One is an effective rate (A1208) of the data to be extracted. One is a user entry form (A1209), which the user is to use if the diagnosing technique corresponding to the diagnostic purpose and the data characteristics is absent in the diagnostic knowledge storage section 202 or if an analysis is to be conducted without using diagnostic knowledge. "Preprocessing" (A1210) includes three elements. One is a preprocessing method (A1211), denoting a preprocessing method considered to be effective for the extracted data. One is an effective rate (A1212) of the data. One is a user entry form (A1213), which the user is to use if the diagnosing technique corresponding to the data characteristics is absent in the diagnostic knowledge storage section 202 or if an analysis is to be conducted without using diagnostic knowledge. "Diagnosis" (A1214) includes three elements. One is a diagnosis method (A1215), which identifies the diagnosis method matching the diagnostic purpose and the data characteristics, by using the extracted data that has been subjected to the preprocessing. One is an effective rate (A1216) of the data. One is a user entry form (A1217), which the user is to use if the diagnosing technique corresponding to the data characteristics is absent in the diagnostic knowledge storage section 202 or if an analysis is to be conducted without using diagnostic knowledge. "Result display" (A1218) includes three elements. One is a result display method (A1219), a method for displaying results of the diagnosis which has been conducted using the extracted data that was subjected to the preprocessing. One is an effective rate (A1220) of the data. One is a user entry form (A1221), which the user is to use if the diagnosing technique corresponding to the data characteristics is absent in the diagnostic knowledge storage section 202 or if an analysis is to be conducted without using diagnostic knowledge. If the corresponding diagnosing technique exists in plurality for each item, a plurality of combinations between one diagnosing technique and the effective rate are displayed, allowing the user to freely select one of the combinations. However, since simultaneous display of the plurality of diagnosing techniques is likely to confuse the user, the number of diagnosing techniques to be displayed is limited by, for example, presenting only up to five diagnosing techniques of higher degrees of effectiveness, by means of a pull-down menu. Additionally or alternatively, after selection of an item (such as a diagnosis method) by the user, a combination with a diagnosing technique to which the diagnosis method belongs may be displayed, for example, in a color-coded format according to the user-selected item, so that the user can readily discriminate the combination of the more effective data and the diagnosing technique. Moreover, the constituent elements of the diagnostic knowledge post-retrieval screen are not limited to the above and if functionality of the constituent elements can be implemented, the number of forms and buttons is arbitrary.

Figure 13:
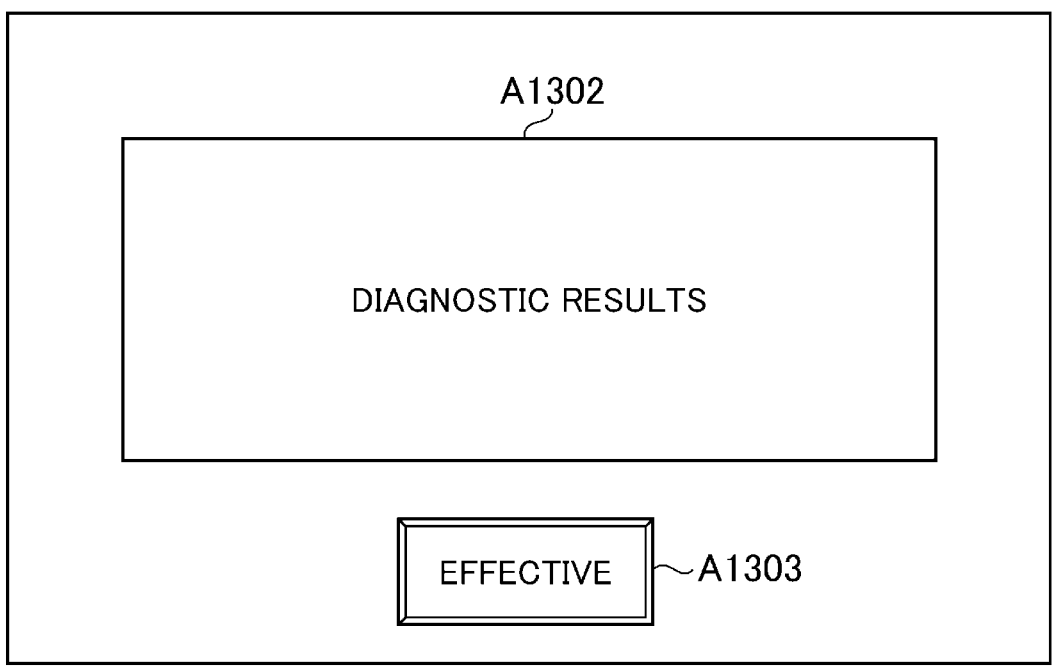
FIG. 13 is a diagram that shows an example of another interface screen presented to the user after the diagnosis in the first embodiment of the present invention.

FIG. 13 is a conceptual diagram representing another screen presented after the user has used the diagnosis device 10 to conduct the diagnosis.

The diagnostic result screen (A1301), displayed in step S311 of FIG. 3, includes a region (A1302) that displays diagnostic results such as a graph, and an EFFECTIVE button (A1303) that the user presses when the diagnostic results are effective. The constituent elements of the diagnostic result display screen are not limited to the elements described here, and if functionality of the constituent elements can be implemented, the number of forms and buttons is arbitrary.

As described above, if a procedure for acquiring and presenting an effective diagnosing technique according to the particular characteristics of diagnostic data is implemented along with an appropriate data structure, even a user who has little knowledge of any procedures or techniques relating to diagnosing construction machines can speedily conduct the diagnosis suitable for the data characteristics of a desired machine.

The present invention is not limited to the above embodiment and may be modified in various forms without departing from the scope of the invention.

Such modifications are, for example, that the diagnosis device 10, the diagnostic knowledge storage device 20, and the diagnostic data storage device 30 may be interconnected via a network, or that machines other than construction machines may be diagnosed.

Even in the modifications, there will be no essential change in the kind or details of processing conducted in the diagnosis device 10.

DESCRIPTION OF REFERENCE NUMBERS AND SYMBOLS

10: Diagnosis device
11: Communications device
12: Input/output device
13: Storage device
14: CPU
15: Memory
16: Reading device
17: Storage medium
18: Intercommunications line
20: Diagnostic knowledge storage device
30: Diagnostic data storage device
101: Input/output section
102: Diagnostic data acquisition section
103: Data characteristics acquisition section
104: Diagnostic knowledge input/output section
105: Diagnosing section
201: Data transmitting/receiving section
202: Diagnostic knowledge storage section
301: Data transmitting/receiving section
302: Diagnostic data storage section
A301: Diagnostic data information
A302: Diagnostic data
A303: Diagnostic purpose, data characteristics
A304: Diagnosing technique, number of application cases
A305: Diagnostic knowledge
A306: Response
A401: Command for acquiring a list of diagnosing technique elements
A402: List of diagnosing technique elements
$A403_1$-$A403_N$: Diagnosing technique elements
$A404_1$-$A404_N$: Data characteristics groups
$A405_1$-$A405_N$: Classified data characteristics, diagnosing technique elements, the number of application cases
$A406_1$-$A406_N$: Response
A501: Diagnostic data
A502: Target machine
A503: Data acquisition date and time
A504: Data acquisition location
A505: Number of parameters being monitored
$A506_1$-$A506_N$: Parameter names
$A507_1$-$A507_N$: Kinds of parameter sensors
$A508_1$-$A508_N$: Parameter data strings
A601: Diagnostic knowledge
A602: Data characteristics
A603: Diagnosing technique
A604: Number of application cases
A701: Data characteristics
A702: Target machine
A703: Data acquisition date and time
A704: Data acquisition location
A705: Number of parameters being monitored
$A706_1$-$A706_N$: Parameter characteristics
$A707_1$-$A707_N$: Parameter names
$A708_1$-$A708_N$: Kinds of sensors
$A709_1$-$A709_N$: Data volumes
$A710_1$-$A710_N$: Run mode counts
$A711_1$-$A711_N$: Data acquisition rates
$A712_1$-$A712_N$: Average values
$A713_1$-$A713_N$: Dispersion values
$A714_1$-$A714_N$: Maximum values
$A715_1$-$A715_N$: Minimum values
$A716_1$-$A716_N$: Variation tendencies
A801: Diagnosing technique
A802: Diagnostic purpose
A803: Data extraction
A804: Preprocessing
A805: Parameters to undergo preprocessing
A806: Preprocessing method
A807: Diagnosis
A808: Diagnosis method
A809: Diagnostic data settings
A810: Result display
A811: Result output method
A812: Highlights of results
A901: Backhoe
A902: Change in crawler pressure of backhoe with time
A903: Loader
A904: Change in crawler pressure of loader with time
A905: Dump truck that travels across flatlands
A906: Time change in engine speed of dump truck which travels across flatlands
A907: Dump truck that travels along slopes
A908: Time change in engine speed of dump truck which travels along slopes
A1001: Input data
A1002: Data characteristics
A1003: Target machine
A1004: Crawler pressure per unit time
A1005: Engine speed per unit time
A1006: Diagnostic purpose
A1007: Loader characteristics
A1008: Backhoe characteristics
A1009: Dump truck (slope) characteristics
A1010: Dump truck (flatland) characteristics
A1011: Diagnosing technique
A1012: Diagnosing technique
A1013: Diagnosing technique
A1014: Diagnosing technique
A1015: Data extraction
A1016: Preprocessing
A1017: Diagnosis
A1018: Result display
A1019: Data extraction
A1020: Preprocessing
A1021: Diagnosis
A1022: Result display
A1023: Data extraction
A1024: Preprocessing
A1025: Diagnosis
A1026: Result display
A1027: Data extraction
A1028: Preprocessing
A1029: Diagnosis
A1030: Result display
A1101: Diagnosing technique element
A1102: Search results
$A1103_1$-$A1103_2$: Classified characteristics
$A1104_1$-$A1104_2$: Number of application cases
$A1105_1$-$A1105_2$: New diagnostic knowledge
A1201: Initial diagnostic screen
A1202: Diagnostic purpose
A1203: Diagnostic data information entry form
A1204: Diagnostic knowledge search button
A1205: Diagnostic knowledge post-retrieval screen
A1206: Diagnostic information on data extraction
A1207: Data extraction method
A1208: Effective rate
A1209: User entry form
A1210: Diagnostic information on preprocessing
A1211: Preprocessing method
A1212: Effective rate A1213: User entry form
A1214: Diagnostic information on diagnosis
A1215: Diagnosis method
A1216: Effective rate
A1217: User entry form
A1218: Diagnostic information on result display
A1219: Result display method
A1220: Effective rate
A1221: User entry form
A1222: DIAGNOSE button
A1301: Diagnostic result screen
A1302: Diagnostic results
A1303: EFFECTIVE button

The invention claimed is:

1. A system for diagnosing a state of a construction machine in accordance with at least parameter data acquired by sensors, the system comprising:
a diagnosis device for diagnosing the construction machine;
a diagnostic knowledge storage device for storage of diagnostic knowledge including a diagnosing technique used for the diagnosis; and
a diagnostic data storage device for storage of diagnostic data including the sensor-acquired parameter data, the diagnostic data being used for the diagnosis;
wherein the diagnosis device includes:
an input and output section for data input and output with respect to outside;
a diagnostic data acquisition section for acquiring, on the basis of the data input to the input and output section, diagnostic data including appropriate parameter data, from the diagnostic data storage device;
a data characteristics acquisition section for acquiring data characteristics of the diagnostic data acquired by the diagnostic data acquisition section, from the acquired diagnostic data, the data characteristics being inclusive of at least parameter characteristics which denote characteristics of the parameter data;
a diagnostic knowledge acquisition section for acquiring, from the diagnostic knowledge storage device, any diagnosing techniques fitting the data characteristics acquired by the data characteristics acquisition section; and
a diagnosing section for conducting the diagnosis using both of the diagnostic data including appropriate parameter data acquired by the diagnostic data acquisition section, and the diagnosing techniques acquired by the diagnostic knowledge acquisition section; wherein
the diagnosis device further includes an effective rate calculation section for calculating an effective rate of each diagnosing technique acquired by the diagnostic knowledge acquisition section;
before conducting the diagnosis, the diagnosing section selects, of the diagnosing techniques acquired by the diagnostic knowledge acquisition section, an optimal diagnosing technique according to particular results of the calculation of the degrees of effectiveness of the acquired diagnosing techniques by the effective rate calculation section;
the diagnostic knowledge further includes the number of application cases that denotes the number of application cases in which a combination of the data characteristics and one of the diagnosing techniques is effective;
the diagnostic knowledge acquisition section acquires the number of application cases in addition to the diagnosing technique; and
the effective rate calculation section calculates the effective rate from a product of two values, wherein one of the two values is a ratio between the number of elements in data characteristics input to the diagnostic knowledge storage device in order to acquire from the device a diagnosing technique fitting the data characteristics previously acquired by the data characteristics acquisition section, and the number of elements in the data characteristics contained in the diagnostic knowledge matching the input data characteristics, and the other value is the number of application cases that is contained in the diagnostic knowledge.

2. The diagnosis system according to claim 1, wherein:
the diagnostic knowledge stored in the diagnostic knowledge storage device includes data characteristics of diagnostic data acquired in advance, and the diagnosing techniques previously determined to be effective for he diagnostic data used for the diagnosis;
the diagnostic knowledge acquisition section acquires at least the diagnosing techniques corresponding to the diagnostic knowledge to which data characteristics fitting the data characteristics acquired by the data characteristics acquisition section belong;
the diagnosing section conducts the diagnosis the diagnostic data acquired by the diagnostic data acquisition section using the diagnosing techniques acquired by the diagnostic knowledge acquisition section; and
the data characteristics of the diagnostic data acquired by the diagnostic data acquisition section, and the data characteristics of the diagnostic data contained in the diagnostic knowledge include, in addition to the parameter characteristics that denote the characteristics which the parameter data has, at least one of the following:
"Target machine" denoting the kind and name of machine being diagnosed;
"Data acquisition date and time" denoting a date and time of acquisition of the diagnostic data;
"Data acquisition location" denoting a location at which the diagnostic data was acquired; and
"Number of parameters being monitored" denoting the number of parameters being monitored in the target machine.

3. The diagnosis system according to claim 2, wherein the parameter characteristics include at least one of the following:
"Parameter name" denoting a name of one of the parameters;
"Kind of sensor" denoting the kind of sensor for which the parameter has been created;
"Data volume" denoting a data volume of the parameter;
"Run mode count" denoting how often the parameter significantly changed within a short time;
"Data acquisition rate" denoting a rate at which the parameter was repeatedly acquired;
"Average value" denoting an average value of the parameter;
"Dispersion value" denoting a dispersion value of the parameter;
"Maximum value" denoting a maximum value of the parameter;
"Minimum value" denoting a minimum value of the parameter; and
"Variation tendency" denoting a tendency for the parameter to change.

4. The diagnosis system according to claim 3, wherein the diagnosing techniques include at least one of the following:

"Diagnostic purpose" denoting a purpose of the diagnosis using the diagnostic data;

"Data extraction method" denoting those parameters within the diagnostic data, that are to be used for the diagnosis;

"Preprocessing method" denoting a method of preprocessing which, prior to the diagnosis, is conducted upon the parameters to be used for the diagnosis;

"Diagnosis method" denoting a scheme and algorithm to be used for the diagnosis; and "Result output method" denoting a way to output execution results of the diagnosis.

5. The diagnosis system according to claim 1, wherein:
the diagnosis device further includes a diagnostic knowledge generating section configured to first collect, among all diagnostic knowledge stored within the diagnostic knowledge storage device, only the diagnostic knowledge that contains common diagnosing technique elements, then generate, as new diagnostic knowledge, combinations of the diagnosing technique elements and what the data characteristics contained in the collected diagnostic knowledge have in common between the constituent elements of the data characteristics, and store the combinations into the diagnostic knowledge storage device.

6. The diagnosis system according to claim 5, wherein:
During the generation of the new diagnostic knowledge, the diagnostic knowledge generating section assigns the number of sets of diagnostic knowledge, each set containing the constituent elements of common data characteristics, as the number of application cases to the new diagnostic knowledge.

\* \* \* \* \*